US008850989B2

(12) United States Patent  
Hunter

(10) Patent No.: US 8,850,989 B2  
(45) Date of Patent: Oct. 7, 2014

(54) MAGNETIC LEVITATION ASSEMBLY

(75) Inventor: Bradley Hunter, Burlington, MA (US)

(73) Assignee: Sandor Wayne Shapery, San Diego, CA (US)

( * ) Notice: Subject to any disclaimer, the term of this patent is extended or adjusted under 35 U.S.C. 154(b) by 590 days.

(21) Appl. No.: 12/960,336

(22) Filed: Dec. 3, 2010

(65) Prior Publication Data

US 2012/0139374 A1 Jun. 7, 2012

(51) Int. Cl.  
*B60L 13/04* (2006.01)  
*B60L 13/06* (2006.01)  
*H02K 7/09* (2006.01)  
*H01F 37/00* (2006.01)  
*H01F 7/02* (2006.01)  
*H01F 7/20* (2006.01)

(52) U.S. Cl.  
CPC ............. *B60L 13/04* (2013.01); *H01F 7/0236* (2013.01); *H01F 2007/208* (2013.01)  
USPC ......... 104/281; 104/283; 310/12.09; 310/90.5

(58) Field of Classification Search  
USPC ........ 310/90.5, 12.09, 12.24, 12.26; 104/284, 104/283, 281  
See application file for complete search history.

(56) References Cited

U.S. PATENT DOCUMENTS

| 3,569,804 | A | | 3/1971 | Studer |
| 3,594,622 | A | | 7/1971 | Inagaki |
| 3,694,041 | A | | 9/1972 | Studer |
| 3,706,922 | A | | 12/1972 | Inagaki |
| 3,780,666 | A | * | 12/1973 | Perrott ................. 104/130.01 |
| 3,780,668 | A | | 12/1973 | Schwarzler et al. |
| 3,791,309 | A | * | 2/1974 | Baermann .................... 104/283 |
| 3,797,402 | A | | 3/1974 | Karch |
| 3,797,403 | A | | 3/1974 | Schwarzler et al. |

(Continued)

FOREIGN PATENT DOCUMENTS

| DE | 21 63 217 A1 | 6/1973 |
| JP | 58 144503 A | 8/1983 |
| WO | WO 01/96139 A2 | 12/2001 |
| WO | WO 2010/111549 A2 | 9/2010 |

OTHER PUBLICATIONS

International Search Report and Written Opinion of the International Searching Authority (in 9 pages), dated May 15, 2013, issued in International Application No. PCT/US2011/062455, filed Nov. 29, 2011.

(Continued)

*Primary Examiner* — Burton Mullins  
(74) *Attorney, Agent, or Firm* — Knobbe, Martens, Olson & Bear, LLP

(57) ABSTRACT

A method and system for transportation using a magnetic bearing structure is disclosed. In one aspect, there is an apparatus for carrying a load along a magnetizable structure. In one embodiment, the apparatus comprises a third structure spaced apart vertically from the magnetizable structure and configured to generate magnetic flux and repel from the magnetizable structure. In one embodiment, the apparatus comprises at least one coil positioned at at least one end portion proximal to the magnetizable structure. In one embodiment, the apparatus comprises at least one flux guide comprising a magnetizable material and configured to concentrate magnetic flux. A first portion of the flux guide is thinner than a second portion of the flux guide that is positioned closer to the magnetizable structure than the first portion of the flux guide.

26 Claims, 7 Drawing Sheets

(56) References Cited

U.S. PATENT DOCUMENTS

| | | | |
|---|---|---|---|
| 3,834,318 A * | 9/1974 | Fellows et al. | 104/284 |
| 3,845,720 A | 11/1974 | Bohn et al. | |
| 3,911,828 A | 10/1975 | Schwarzler | |
| 3,924,537 A | 12/1975 | Matsui et al. | |
| 4,315,197 A | 2/1982 | Studer | |
| 4,324,185 A | 4/1982 | Vinson | |
| 5,009,865 A | 4/1991 | Boden et al. | |
| 5,360,470 A | 11/1994 | Ono et al. | |
| 5,372,636 A | 12/1994 | Gray et al. | |
| 5,379,864 A | 1/1995 | Colby | |
| 5,440,997 A * | 8/1995 | Crowley | 104/283 |
| 5,757,098 A | 5/1998 | Higuchi et al. | |
| 5,923,109 A | 7/1999 | Higuchi et al. | |
| 5,959,382 A | 9/1999 | Dauwalter | |
| 6,069,417 A * | 5/2000 | Yuan et al. | 310/12.07 |
| 6,101,952 A | 8/2000 | Thornton et al. | |
| 6,268,673 B1 | 7/2001 | Shah et al. | |
| 6,338,396 B1 * | 1/2002 | Morishita | 187/292 |
| 6,396,178 B1 | 5/2002 | Chiu | |
| 6,977,451 B2 | 12/2005 | Onishi | |
| 7,617,779 B2 | 11/2009 | Studer | |
| 2006/0113848 A1 | 6/2006 | Studer | |
| 2006/0243158 A1 * | 11/2006 | Li | 104/281 |
| 2008/0223249 A1 * | 9/2008 | Studer | 104/284 |
| 2009/0032350 A1 | 2/2009 | Shapery | |
| 2009/0079284 A1 * | 3/2009 | Onuma et al. | 310/90.5 |
| 2010/0301979 A1 | 12/2010 | Studer et al. | |

OTHER PUBLICATIONS

International Preliminary Report on Patentability of the International Preliminary Examining Authority (in 16 pages), dated Sep. 30, 2013, issued in International Application No. PCT/US2011/062455, filed Nov. 29, 2011.

* cited by examiner

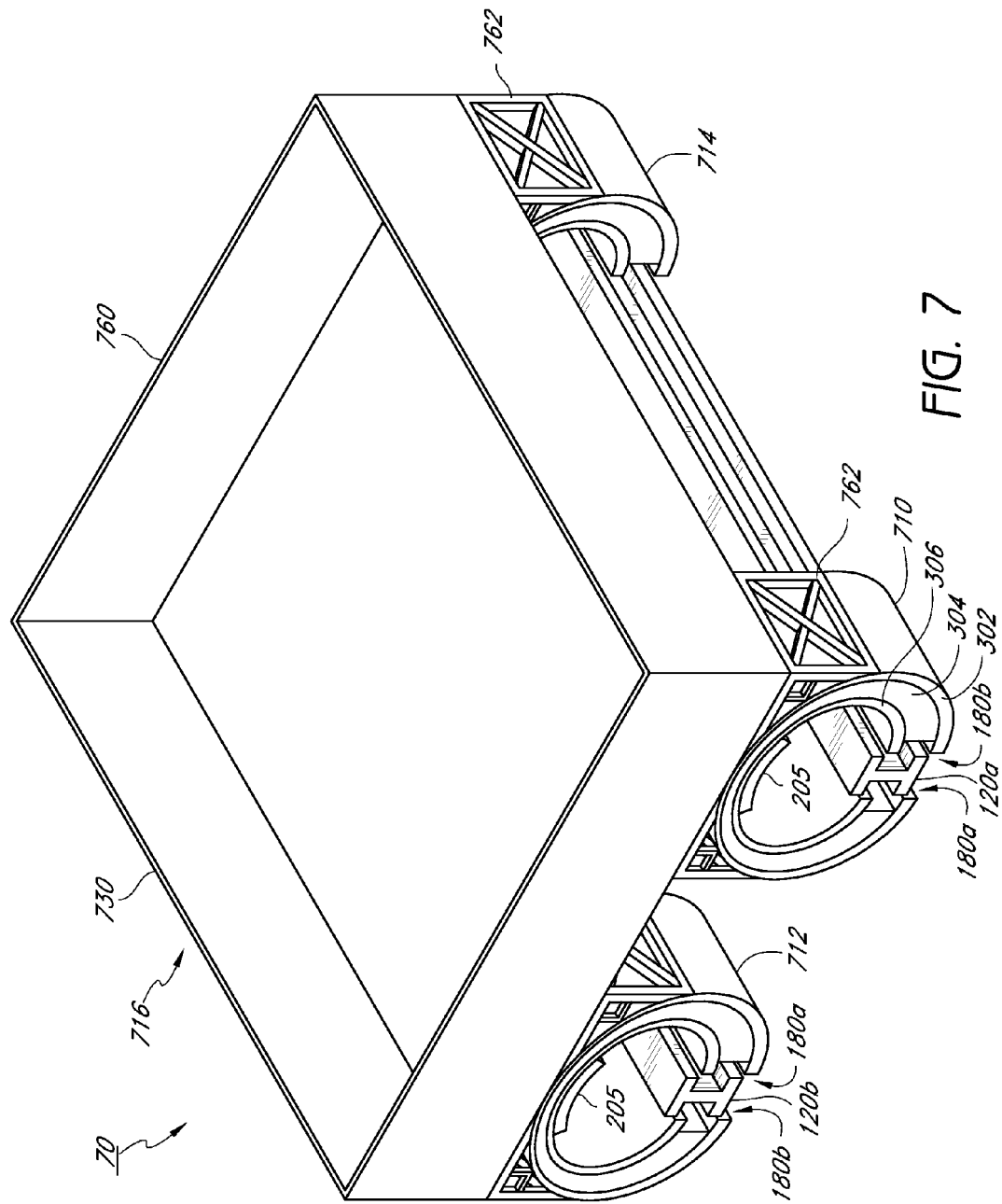

MAGNETIC LEVITATION ASSEMBLY

CROSS-REFERENCE TO RELATED APPLICATIONS

This application is related to U.S. application Ser. No. 12/732,098, filed on Mar. 25, 2010, which is hereby incorporated by reference in its entirety.

BACKGROUND

Field

The invention generally relates to a method and system for transportation using a magnetic bearing structure. More particularly, the invention generally applies to levitation of a load for transportation.

SUMMARY

In one aspect, there is an apparatus for carrying a load. The apparatus comprises a first structure spaced apart horizontally from a first side of a magnetizable structure and configured to generate magnetic flux and a second structure spaced apart horizontally from a second side of the magnetizable structure and configured to generate magnetic flux. The second side is opposite the first side and the first and second structures are magnetically attracted to the magnetizable structure. The apparatus comprises a third structure spaced apart vertically from the magnetizable structure and configured to generate magnetic flux. The third structure comprises a third upper portion and a third lower portion of opposite polarities and the third lower portion is positioned to magnetically repel from an upper portion of the magnetizable structure.

In another aspect, there is an apparatus for carrying a load. The apparatus comprises a first structure spaced apart horizontally from a first side of a magnetizable structure and configured to generate magnetic flux and a second structure spaced apart horizontally from a second side of the magnetizable structure and configured to generate magnetic flux. The second side is opposite the first side and the first and second structures are magnetically attracted to the magnetizable structure. The apparatus comprises at least one coil positioned at at least one end of the first and second structures.

In another aspect, there is an apparatus for carrying a load. The apparatus comprises a first structure spaced apart horizontally from a first side of a magnetizable structure and configured to generate magnetic flux and a second structure spaced apart horizontally from a second side of the magnetizable structure and configured to generate magnetic flux. The second side is opposite the first side and the first and second structures are magnetically attracted to the magnetizable structure. The apparatus comprises at least one magnetic flux guide comprising a magnetizable material and configured to concentrate magnetic flux generated by the first and second structures. A first portion of the magnetic flux guide is thinner than a second portion of the magnetic flux guide that is positioned closer to the magnetizable structure than the first portion of the magnetic flux guide.

BRIEF DESCRIPTION OF THE DRAWINGS

FIG. 7 is a perspective view of a system comprising a vehicle having a load coupled to magnetic bearing structures positioned proximally to rails.

DETAILED DESCRIPTION

The following detailed description is directed to certain specific aspects of the invention. However, the invention may be embodied in a multitude of different ways, for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Similarly, methods disclosed herein may be performed by one or more computer processors configured to execute instructions retrieved from a computer-readable storage medium. A computer-readable storage medium stores information, such as data or instructions, for some interval of time, such that the information may be read by a computer during that interval of time. Examples of computer-readable storage media are memory, such as random access memory (RAM), and storage, such as hard drives, optical discs, flash memory, floppy disks, magnetic tape, paper tape, and punch cards.

Figure 1:
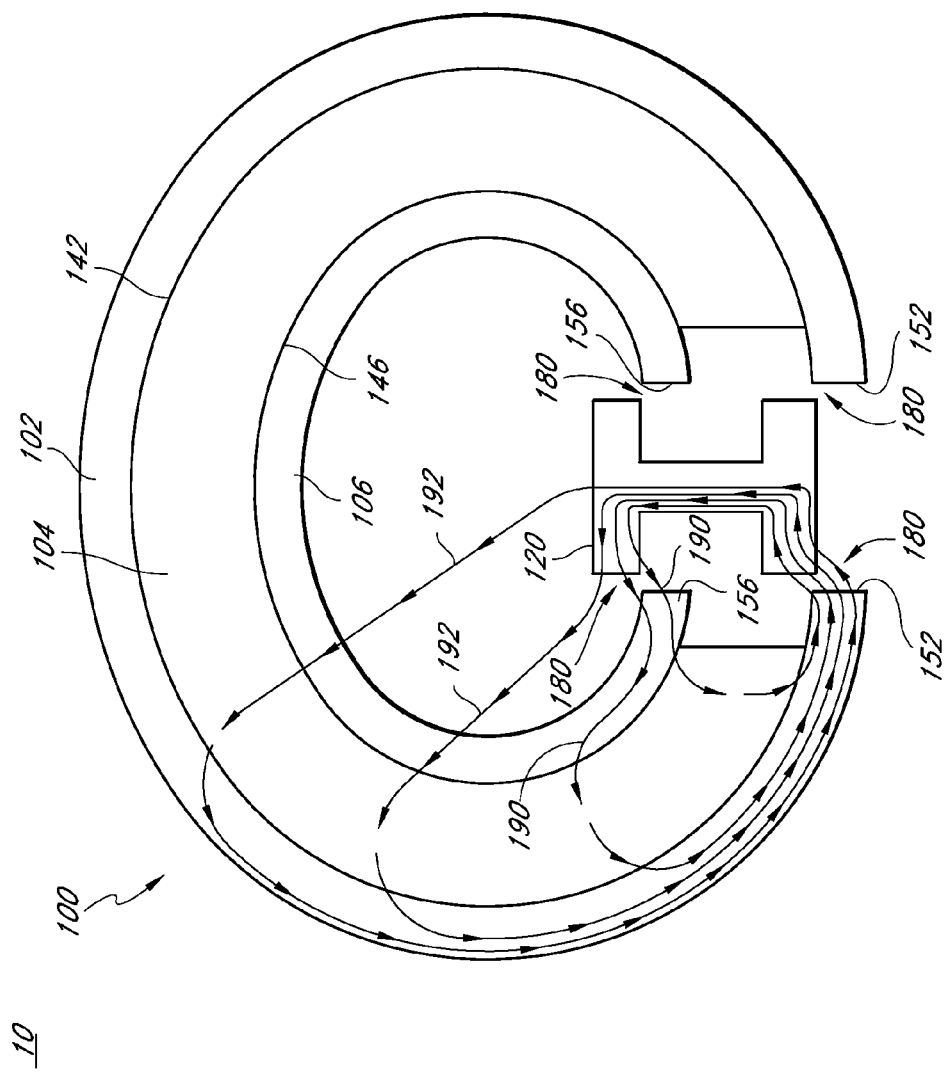
FIG. 1 is a cross-sectional view of a system comprising a tubular magnetic bearing structure positioned proximally to a rail illustrating a plurality of magnetic flux paths.

FIG. 1 is a cross-sectional view of a system 10 comprising a tubular magnetic bearing structure 100 positioned proximally to a rail 120 illustrating first magnetic flux paths 190 and second magnetic flux paths 192. The magnetic bearing structure 100 comprises a source of magnetic flux 104 between an inner shell 106 and an outer shell 102. In one embodiment, the outer shell 102 has a C-shaped cross-section and is positioned concentrically about the inner shell 106, which has a similarly C-shaped cross-section. Both the inner shell 106 and outer shell 102 may comprises a magnetizable material, such as iron or steel. The shells 102 and 106 may guide magnetic flux generated by the source of magnetic flux 104 along the inner and outer perimeter of the magnetic bearing structure 100. This may assist in containing and concentrating the magnetic flux of the source of magnetic flux 104 across the air gaps 180 between the magnetic bearing structure 100 and a rail 120.

The rail 120 illustrated in FIG. 1 generally has an I-shaped cross-section. In other embodiments, other shapes may be used. In one embodiment, the rail 120 is narrow enough to fit between the gaps between end regions 152 of the outer shell 102 and end regions 156 of the inner shell 106. In one embodiment, the rail 120 is narrow enough to fit between the gaps between the end regions 152 and 156 without physically contacting the magnetic bearing 100. The rail 120 may be of any axial length to allow propulsion in addition to levitation.

In one embodiment, the rail 120 comprises magnetizable material such as steel or iron. In another embodiment, the rail 120 comprises a magnetic material. The bearing 100 may "capture and restrain" the rail 120 since any vertical movement of the magnetic bearing structure 100 is resisted by magnetic forces generated by the source of magnetic flux 104 which tend to minimize the length of the magnetic flux paths 190 and 192.

In one embodiment, the rail 120 comprises at least two substantially parallel rails separated by a gauge, each rail having a generally I-shaped profile with a head and a foot separated by a web. In one embodiment, the rail 120 comprises standard or international gauge rails, e.g., the gauge is approximately 1,435 mm. The gauge may be smaller or larger than 1,435 mm. In one embodiment, the rails allow flanged wheels to ride along the head of the rail. Accordingly, embodiments described herein may be compatible with existing rail technology and other rolling stock.

When magnetic flux crosses the air gaps 180 between the magnetic bearing structure 100 and the rail 120, there is a magnetic attraction between the magnetic bearing structure 100 and the rail 120. Because of this attraction, the magnetic bearing structure may support a load without contacting the rail 120. Thus, the magnetic bearing structure 100 may be used to provide a levitative force that counters the force of gravity upon a vehicle. The levitative force may reduce friction as the vehicle moves along the rail 120.

In one embodiment, the source of magnetic flux 104 comprises outer edge surfaces 142 that contact the outer shell 102 and inner edge surfaces 146 that contact the inner shell 106. In one embodiment, the outer edge surfaces 142 are of one polarity and the inner edge surfaces 146 are of an opposite polarity. For example, in one embodiment, the source of magnetic flux 104 may be uniformly radially magnetized.

In one embodiment, the source of magnetic flux 104 comprises a single permanent magnet. Permanent magnets may comprise rare earth magnets, samarium-cobalt magnets, alnico magnets, and neodymium magnets. The use of permanent magnets allows the bearing 100 to provide "always on" levitation forces which do not require an electric power source. In other embodiments, the source of magnetic flux 104 may comprise one or more permanent magnets and/or one or more electromagnets. In one implementation, an electromagnet may be coupled to a power source configured to energize the electromagnet.

In one embodiment, the source of magnetic flux 104 is a bonded magnet. In one embodiment, a bonded magnet comprises a magnetic powder blended together with a thermoplastic resin to form injection molded, compression, or flexible magnets. The magnetic powder may be aligned in a preferred direction while the resin is liquid and may be maintained in this preferred direction by the resin when it is hardened. A bonded magnet may be used to minimize stray flux, e.g., flux projecting outside the desired boundaries of the magnetic bearing 100.

In another embodiment, the source of magnetic flux 104 comprises multiple magnets, either separated or adjoined. In one embodiment, each of the multiple magnets is arranged such that one polarity faces the outer shell 102 and the other polarity faces the inner shell 106. In one embodiment, a non-magnetizable substance, such as glass, wood, resin, or air, is placed between the magnets. If the source of magnetic flux 104 comprises a plurality of magnets rather than a single magnet, the source of magnetic flux 104 may be less expensive. However, if the magnets are too spaced apart, magnetic flux may leak through non-magnetizable material rather than through the rail 120. The leakage of magnetic flux may decrease the levitative force.

Although a tubular magnetic bearing structure 100 is illustrated in FIG. 1, it is to be appreciated that other cross-sectional shapes may be used. For example, in one embodiment, the magnetic bearing structure 100 may have a rectangular cross-section or a triangular cross-section. If the magnetic bearing structure has, for example, a rectangular cross-section, the magnetic bearing structure 100 may be more easily attached to a vehicle or more easily stored. Further, if the magnetic bearing structure 100 has one or more flat surfaces, manufacture of the source of magnetic flux 104 may be simplified and other hardware may be more easily installed.

Although magnetic flux paths 190 and 192 are only illustrated for half of FIG. 1, it is to be appreciated that the magnetic flux generated by the source of magnetic flux 104 may be symmetrical about the vertical axis. Further, although only four magnetic flux paths 190 and 192 are illustrate in FIG. 1, it is to be appreciated that the magnetic flux generated by the source of magnetic flux 104 may be a continuous magnetic field and more or fewer magnetic flux paths 190 and 192 could be used to represent it.

The outer shell 102 comprises two end regions 152 located proximally to protrusions of the rail 120. The inner shell 106 also comprises two end regions 156 similarly located proximally to protrusions of the rail 120. In one embodiment, the source of magnetic flux 104 generates a magnetic field represented by the first magnetic flux paths 190 and the second magnetic flux paths 192. The first magnetic flux paths 190 and the second magnetic flux paths 192 begin and end at the source of magnetic flux 104. The outer shell 102 guides the magnetic flux paths 190 and 192 along the outer shell 102 to one of the end regions 152 where they cross an air gap 180 between the outer shell 102 and the rail 120. The first magnetic flux paths 190 continue via the rail 120 and exit the rail 120 by crossing an air gap 180 between the rail 120 and one of the end regions 156 of the inner shell 106. The inner shell 106 guides the first magnetic flux paths 190 along the inner shell 106 back to the source of magnetic flux 104. Depending on the polarity of the source of magnetic flux 104, this order may be reversed.

As mentioned above, when magnetic flux crosses the air gaps 180 between the magnetic bearing structure 100 and the rail 120, there is a magnetic attraction between the magnetic bearing structure 100 and the rail 120. The horizontal components of the first magnetic flux paths 190 may add to approximately zero when the magnetic bearing structure 100 is centered with respect to the rail 120. The vertical components of the first magnetic flux paths 190 on both sides of the rail 120 may each contribute to a vertical force acting upon the magnetic bearing structure 100. Thus, the magnetic bearing structure 100 may be used to provide a levitative force that counters the force of gravity upon a load, such as a vehicle. The levitative force may reduce friction as the vehicle moves along the rail 120.

Depending on the configuration, it is possible that not all of the magnetic flux paths 190 and 192 cross the air gaps 180 from the rail 120 to the magnetic bearing structure 100. The first magnetic flux paths 190 may cross the air gaps 180 twice, by crossing the air gaps 180 a first time when flowing from the magnetic bearing structure 100 to the rail 120 and crossing the air gaps 180 a second time when crossing the from rail 120 to the magnetic bearing structure 100. The second magnetic flux paths 192 may not cross the air gaps 180 twice. The second magnetic flux paths 192 may begin at a portion of the source of magnetic flux 104 that is far from the air gaps 180. The second magnetic flux paths 192, like the first magnetic flux paths 190, may be guided by the outer shell 102 to one of the end regions 152 of the outer shell 102, cross the air gap 180 between the outer shell 102 and the rail, and continue via the rail 120. However, the second magnetic flux paths 192, unlike the first magnetic flux paths 190, may not cross the air gaps 180 to one of the end regions 156 of the inner shell 106, but rather, may "short circuit" to a portion of the inner shell 106 further from the end regions 156.

The second magnetic flux paths 192 may not be as desirable as the first magnetic flux paths 190 because a second magnetic flux path 192 may not twice cross the air gap 180 and may produce less levitative force than a first magnetic flux path 190 that crosses the air gap 180 twice. The second magnetic flux paths 192 may not be as desirable as the first magnetic flux paths 190 because the vertical components of the portion of the second magnetic flux paths 192 from the rail 120 to the inner shell 106 may generate a downward force, reducing the amount of levitative force produced by the magnetic bearing structure 100.

Figure 2:
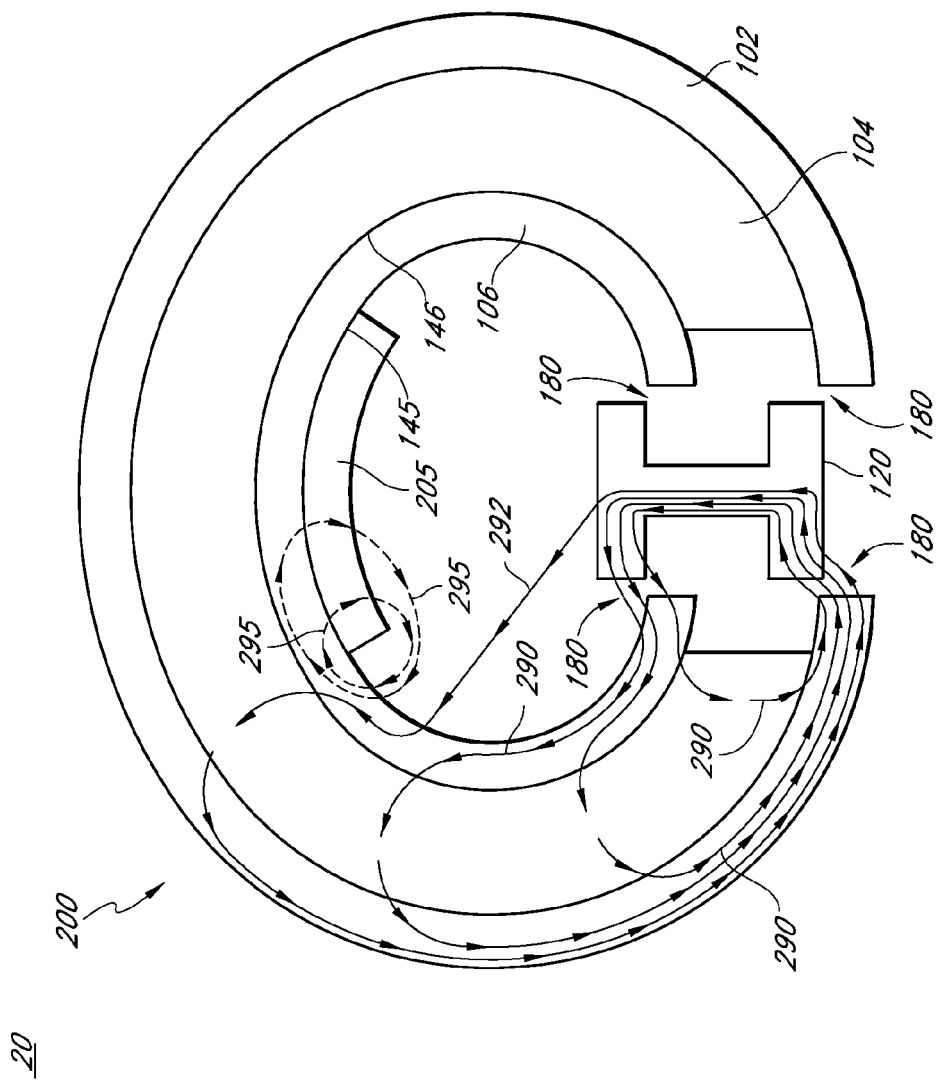
FIG. 2 is a cross-sectional view of a system comprising a tubular magnetic bearing structure having a focusing source of magnetic flux illustrating a plurality of magnetic flux paths.

FIG. 2 is a cross-sectional view of a system 20 comprising a tubular magnetic bearing structure 200 having a focusing source of magnetic flux 205 illustrating first magnetic flux paths 290, second magnetic flux paths 292, and third magnetic flux paths 295. The system 20 differs from the embodiment described with respect to FIG. 1 in that it additionally comprises a focusing source of magnetic flux 205 positioned between the inner shell 106 and the rail 120. Otherwise, the remaining structure of the system 20 may be the same as or similar to the system 10 of FIG. 1, described above.

In one embodiment, the focusing source of magnetic flux 205 comprises a single permanent magnet. In other embodiments, the focusing source of magnetic flux 205 may comprise one or more permanent magnets and/or one or more electromagnets. In one implementation, an electromagnet may be coupled to a power source configured to energize the electromagnet. In one embodiment, the focusing source of magnetic flux 205 is a bonded magnet. In another embodiment, the focusing source of magnetic flux 205 comprises multiple magnets, either separated or adjoined.

In one embodiment, the focusing source of magnetic flux 205 comprises at least one of a rare earth magnet, a samarium-cobalt magnet, an alnico magnet, and a neodymium magnet. In one embodiment, the focusing source of magnetic flux 205 has a radial thickness (as shown in FIG. 2) that is approximately one-fifth a radial thickness of the source of magnetic flux 104. In one embodiment, the focusing source of magnetic flux 205 is approximately half the length of the source of magnetic flux 104.

In one embodiment, the focusing source of magnetic flux 205 comprises outer edge surfaces 145 that contact the inner shell 106. In one embodiment, the outer edge surfaces 145 of the focusing source of magnetic flux 205 are of the same polarity as the inner edge surfaces 146 of the source of magnetic flux 104.

The focusing source of magnetic flux 205 may alter the magnetic flux paths 290 and 292 that begin at the source of magnetic flux 104. The first magnetic flux paths 290 may cross the air gaps 180 twice, by crossing the air gaps 180 a first time when flowing from the magnetic bearing structure 100 to the rail 120 and crossing the air gaps 180 a second time when crossing the from rail 120 to the magnetic bearing structure 100. The second magnetic flux paths 292 may not cross the air gaps 180 twice. The third magnetic flux paths 295 may begin and end at the focusing source of magnetic flux 205.

The focusing source of magnetic flux 205 may increase the number of first magnetic flux paths 290 and reduce the number of second magnetic flux paths 292. Conceptually, the third magnetic flux paths 295 may repel at least the second magnetic flux paths 292. As described above, the second magnetic flux paths 292 may not be as desirable as the first magnetic flux paths 290 because a second magnetic flux paths 292 may not twice cross the air gap 180 and may produce less levitative force than a first magnetic flux path 290 that crosses the air gap 180 twice. The second magnetic flux paths 292 may not be as desirable as the first magnetic flux paths 290 because the vertical components of the portion of the second magnetic flux paths 292 from the rail 120 to the inner shell 206 may generate a downward force, reducing the amount of levitative force produced by the magnetic bearing structure 200. Thus, because the focusing source of magnetic flux 205 may increase the number of first magnetic flux paths 290 and reduce the number of second magnetic flux paths 292, the focusing source of magnetic flux 205 may increase the net levitative force generated by the magnetic bearing structure 200. In particular, the focusing source of magnetic flux 205 may increase the net levitative force generated by the magnetic bearing structure 200 at least ten percent as compared to net levitative force generated by a magnetic bearing structure without a focusing source of magnetic flux.

As can be seen in FIG. 2, the density of magnetic flux paths 290 and 292 within the outer shell 102 and inner shell 106 may not be radially uniform. In particular, portions of the outer shell 102 and inner shell 106 closer to the air gaps 180 may guide more flux than the portions of the outer shell 102 and inner shell 106 further from the air gaps 180. Thus, the portions of the outer shell 102 and inner shell 106 further from the air gaps 180 may be unnecessarily thick with respect to the guided flux. This may add additional, unnecessary weight to the magnetic bearing structure 200 and may reduce the net levitative force.

Figure 3:
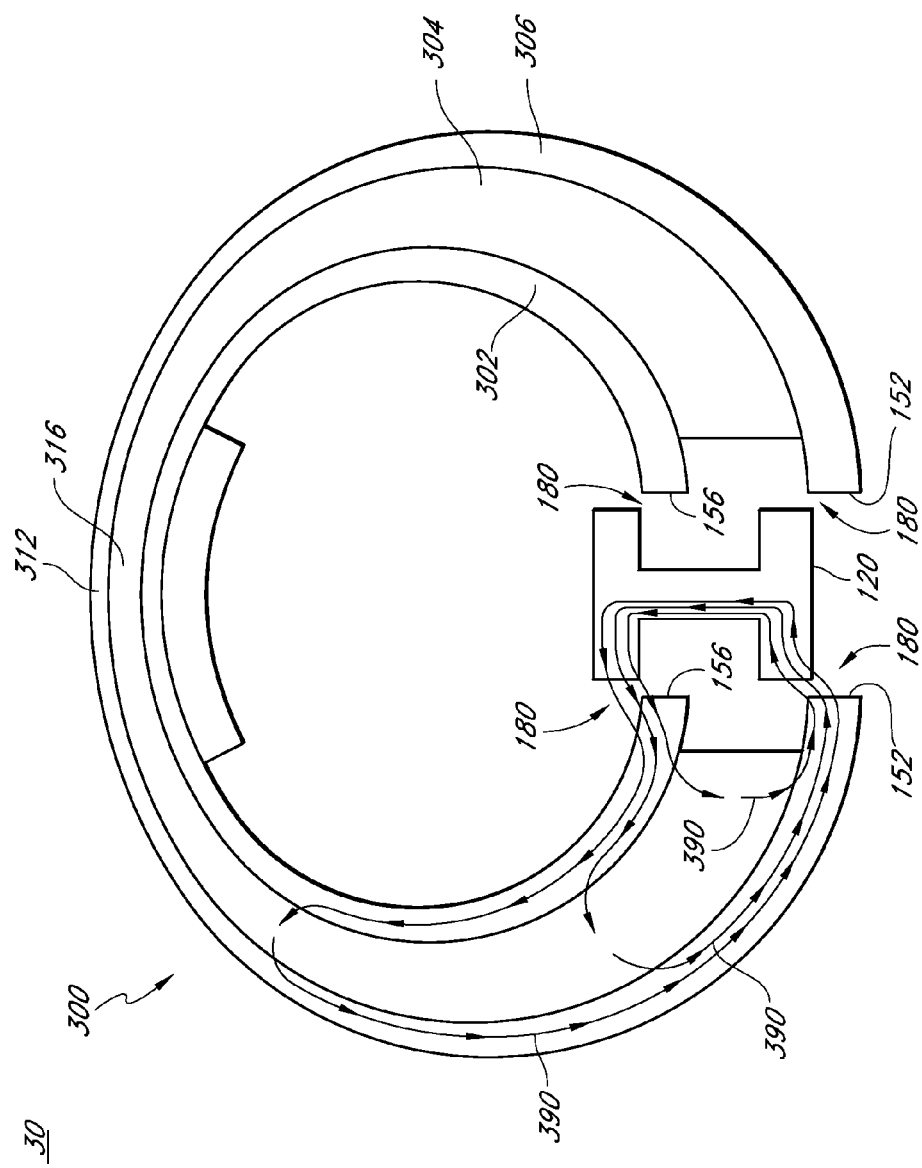
FIG. 3 is a cross-sectional view of a system comprising a tubular magnetic bearing structure having radial non-uniformity illustrating a plurality of magnetic flux paths.

FIG. 3 is a cross-sectional view of a system 30 comprising a tubular magnetic bearing structure 300 having radial non-uniformity illustrating a plurality of magnetic flux paths 390. The system 30 differs from the embodiment described with respect to FIG. 2 in that the outer shell 302, source of magnetic flux 304, and inner shell 306 are of a non-uniform radial thickness. In particular, the outer shell 302, source of magnetic flux 304, and inner shell 306 may be of varying thickness. In one embodiment, portions of the outer shell 302, source of magnetic flux 304, and inner shell 306 that are closer to the air gaps 180 are thicker than the portions of the outer shell 302, source of magnetic flux 304, and inner shell 306, respectively, that are further from the air gaps 180. In one embodiment, the outer shell 302 is shaped such that the radial thickness of the outer shell 302 decreases from an end portion 152 to the middle of the outer shell 312. In one embodiment, the inner shell 306 is shaped such that the radial thickness of the inner shell 306 decreases from an end portion 156 to the middle of the inner shell 316. In one embodiment, the radial thickness of at least one of the outer shell 302 and the inner shell 306 decreases from the end portion 152 and 156 to the middle of the shell 312 and 316 in an approximately linear manner. In another embodiment, the radial thickness of at least one of the outer shell 302 and the inner shell 306 decreases from the end portion 152 and 156 to the middle of the shell 312 and 316 in a non-linear manner. In one embodiment, the outer shell 302 and inner shell 306 are shaped such that the magnetic flux density within each shell 302 and 306 is substantially radially uniform.

The use of an outer shell 302, source of magnetic flux 304, or inner shell 306 having a non-uniform radial thickness may reduce the weight of the magnetic bearing structure 300. Reducing the weight of the magnetic bearing structure 300 may increase the net levitative force produced by the magnetic bearing structure 300 because any savings in weight of the magnetic bearing structure 300 would be equivalent to additional weight that can be added to a load.

The system 30 also differs from the embodiment described with respect to FIG. 2 in that the source of magnetic flux 304 may be of a non-uniform radial strength. In one embodiment, portions of the source of magnetic flux 304 that are closer to the air gaps 180 are stronger than the portions of the source of magnetic flux 304 that are further from the air gaps 180.

As can be seen in FIG. 2, the second flux paths 292 tend to originate from portions of the source of magnetic flux 104 further from the air gaps 180 than portions of the source of magnetic flux 104 from which the first magnetic flux paths 290 originate. The use of a source of magnetic flux 304 having a strength which is not radially uniform may reduce the number of magnetic flux paths that do not cross the air gaps 180 twice. As described above, such magnetic flux paths may be undesirable and reduce the net levitative force produced by the magnetic bearing structure 300. Thus, the use of a source of magnetic flux 304 having a strength which is not radially uniform may increase the net levitative force produced by the magnetic bearing structure 300.

Apart from the radial non-uniformity described above, the remaining structure of the system 30 may be the same as or similar to the system 20 of FIG. 2, also described above.

As mentioned above, the horizontal components of the magnetic flux paths 390 crossing the air gaps 180 on both sides of the rail 120 may add to approximately zero when the magnetic bearing structure 300 is centered with respect to the rail 120. However, this may be an unstable position.

Figure 4:
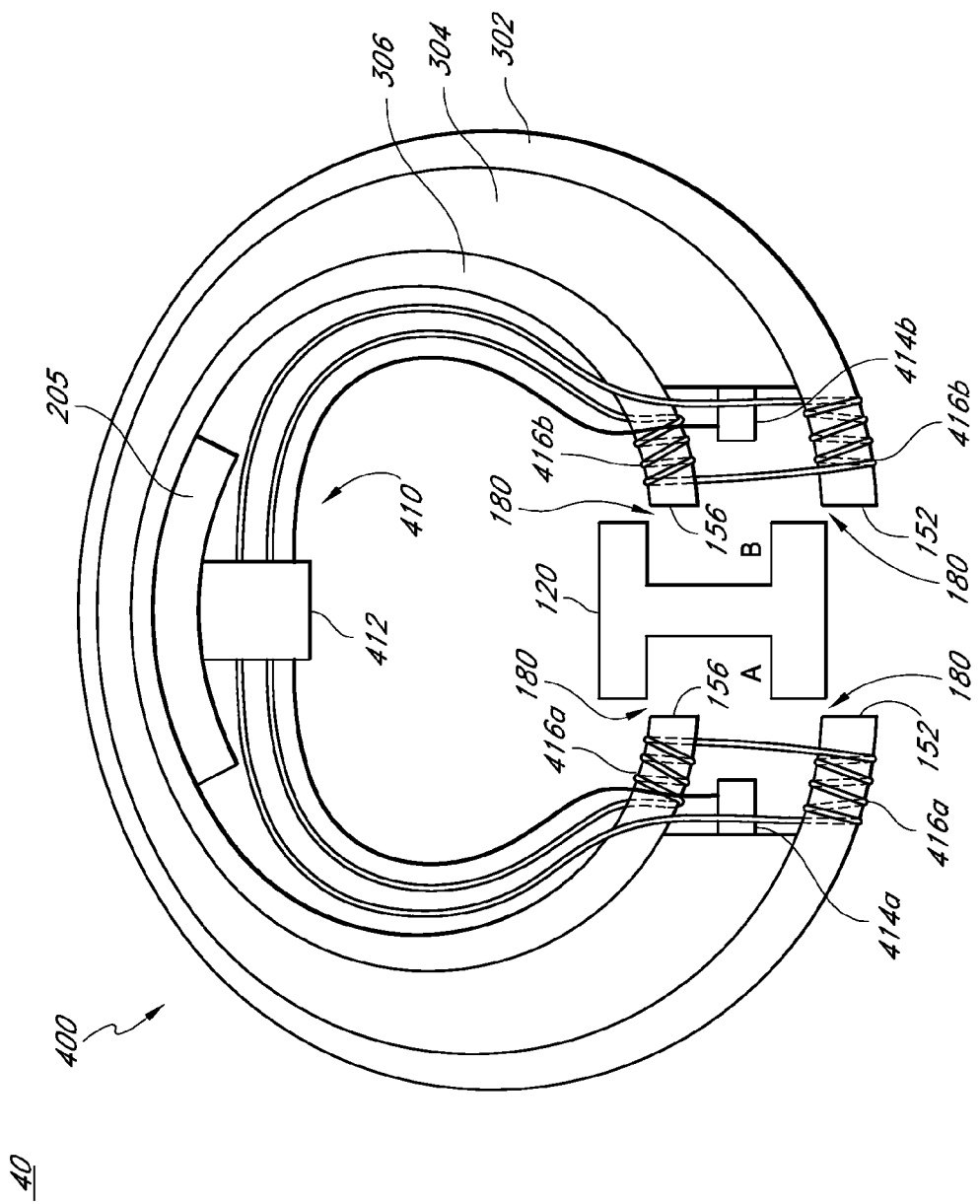
FIG. 4 is a front view of a system comprising the tubular magnetic bearing structure of FIG. 3 with a control system for maintaining the horizontal position of the magnetic bearing structure.

FIG. 4 is a front view of a system 40 comprising the tubular magnetic bearing structure of FIG. 3 with a control system 410 for maintaining the horizontal position of the magnetic bearing structure 400. The system 40 differs from the embodiment described with respect to FIG. 3 in that the magnetic bearing structure 400 comprises a control system 410 for maintaining the horizontal position of the magnetic bearing structure. Otherwise, the remaining structure of the system 40 may be the same as or similar to the system 30 of FIG. 3, described above.

The control system 410 may comprise a controller 412, one or more sensors 414a and 414b, and one or more coils 416a and 416b. In one embodiment, the controller 412 is attached to the focusing source of magnetic flux 205 between the rail 120 and the focusing source of magnetic flux 205. Although the controller 412 is illustrated in FIG. 4 within the magnetic bearing structure, it is to be appreciated that the controller 412 may be located elsewhere. For example, it may be desirable to position the controller 412 at a position with a sufficient distance from the source of magnetic flux 304 to minimize or eliminate interference with electronics within the controller 412 or to eliminate or reduce difficulties in servicing the controller 412. Whereas the controller may be located within an inner space defined by the magnetic bearing structure 400 (as shown in FIG. 4), the controller 412 may also be located entirely outside the inner space defined by the magnetic bearing structure 400, e.g., within a load of a vehicle to be carried by the magnetic bearing structure 400. The controller 412 may also be located at a position midway between two magnetic bearing structures each positioned proximally to a corresponding rail, e.g., midway between magnetic bearing structures 710 and 712 of FIG. 7, described below.

The one or more sensors 414a and 414b may be attached to the source of magnetic flux 304 and positioned at ends of source of magnetic flux 304 between the rail 120 and the source of magnetic flux 304. Each of the one or more coils 416a and 416b may be wound around one of two end regions 152 of the outer shell 302 or one or two end regions 156 of the inner shell 306. In one embodiment, the length of the end regions 152 and 156 is approximately equal to the thickness of the end regions 152 and 156. The sensors 414a and 414b and coils 416a and 416b may be coupled to the controller 412 by one or more wireless or wired connections.

The control system 410 may control of magnitude and direction of the current through the coils 416a and 416b to horizontally center the magnetic bearing structure 400 with respect to the rail 120. In one embodiment, the control system 410 preserves air gaps 180 between the source of magnetic flux 304 and the rail 120 of a substantially constant size by balancing attractive horizontal forces between the source of magnetic flux 304 and the rail 120. The size of the air gaps 180 may be defined as the minimum distance between the ends 152 and 156 of the magnetic bearing structure 400 and the rail 120. In one embodiment, the size of the air gaps is approximately one-fifth the radial thickness of the source of magnetic flux 304 closest to the end regions 152 and 156. In one embodiment, the control system 410 operates to equalize the magnetic flux on both sides of the rail 120. In one embodiment, the control system 410 preserves substantially equal air gaps 180 on both sides of the rail.

One or more sensors 414a and 414b may be used to determine the horizontal position of the magnetic bearing structure 400 and to provide this information to the controller 412. The sensors 414a and 414b may generate sensor data indicative of a distance from at least one of the sensors 414a and 414b to the rail 120, another object, or to a predefined reference point. The sensors 414a and 414b may comprise, but are not limited to, an inductive proximity sensor, a capacitive displacement sensor, or a laser rangefinder. In one embodiment, the sensors 414a and 414b emit a light or acoustic signal towards the rail 120 and measure changes in a light or acoustic signal reflected by the rail 120. In another embodiment, the sensors 414a and 414b may generate sensor data indicative of a rate of change of a distance from at least one of the sensors 414a and 414b to the rail 120, another object, or a predetermined reference point. The sensors 414a and 414b may comprise a Doppler-based sensor. In one embodiment, the sensors 414a and 414b emit a light or acoustic signal towards the rail 120 and measure a change in the wavelength of a light or acoustic signal reflected by the rail 120.

Each coil 416a and 416b may carry an electric current that, in turn, generates a magnetic flux within the coil 416a and 416b. Accordingly, each coil 416a and 416b may operate as an electromagnet that generates a magnetic flux in response to an electric current provided by the controller 412. The "right-hand rule" can be used to determine the direction of flux produced by an electrical current flowing through one of the coils 416a and 416b. The right-hand rule generally stands for the proposition that when the fingers of a person's right hand are wrapped in the direction of current flow (either clockwise or anti-clockwise), the person's thumb points in the direction of the generated magnetic flux. The generated magnetic flux may bias the magnetic flux generated by the source of magnetic flux 304 and may provide a net horizontal force to the magnetic bearing structure 400 through differential flux control. In particular, the amount of magnetic flux crossing the air gaps 180 on either side of the rail 120 may be differentially modulated by adding the bias magnetic flux generated by the coil 416a and 416b to the magnetic flux generated by the source of magnetic flux 304.

In one embodiment, the coils 416a and 416b comprise four coils, each wound around one of two end regions 152 of an outer shell 302 or one or two end regions 156 of an inner shell 306. In particular, the coils 416a and 416b may be wound around protrusions at the end regions 152 and 156. The two coils 416a on side A of the rail 120 may be connected in series or in parallel to produce a net horizontal force in a desired direction. Similarly, the two coils 416b on side B of the rail 120 may be connected in series or in parallel to produce a net horizontal force in a desired direction. In one embodiment, the four coils 416a and 416b are connected in series to produce a net horizontal force in the same direction. In another embodiment, the two coils 416a on side A of the rail 120 and the two coils 416b on side B of the rail are independently controllable. Independently controlling the coils 416a and 416b on opposite sides of the rail allows the controller 412 to control not only the differential flux, but the total flux. Modulating the total flux generated by the coils 416a and 416b may modulate the net levitative force produced by the magnetic bearing structure 400.

The controller 412 may modulate the net levitative force to provide active damping of vertical motion. For example, one or more or the sensors 414a and 414b may be used to determine the vertical position of the magnetic bearing structure 400 and to provide this information to the controller 412. The sensors 414a and 414b may generate sensor data indicative of a distance from at least one of the sensors 414a and 414b to the ground, another object, or to a predefined reference point. In one embodiment, if the vertical position of the magnetic bearing structure 400 is above a predetermined location, the controller 412 may decrease the net levitative force by decreasing the current within the coils 416a and 416b. If the vertical position of the magnetic bearing structure 400 is below a predetermined location, the controller 412 may increase the net levitative force by increasing the current within the coils 416a and 416b.

Placement of the coils 416a and 416b proximal to the rail may be particularly advantageous as the magnetic flux generated by the coils 416a and 416b is more likely to cross the air gaps 180 to the rail 120. Placement of the coils 416a and 416b proximal to the rail may reduce the amount of power needed to control the horizontal position of the magnetic bearing structure 400.

The controller 412 may be a processor or other circuit configured to receive information from at least one of the sensors 414a and 414b indicative of the horizontal position of the magnetic bearing structure 400 and to generate an electric current in one or more of the coils 416a and 416b based on the received information.

In one embodiment, the control system 410 generates the current based on the horizontal position of the magnetic bearing structure 400 relative to the rail 120 as determined by the sensors 414a and 414b. In one embodiment, the strength of the current is proportional or inversely proportional to a distance indicated by the sensors 414a and 414b. For example, in one embodiment, the source of magnetic flux 304 may be polarized such that magnetic flux is guided from the outer shell 302 through its end region 152 (e.g., on side A), through the rail 120, and back to the inner shell 306 through its end region 156 on the same side (e.g., on side A). In one embodiment, one coil 416a on side A of the rail 120 may be wound around the end region 156 of the inner shell 306 such that current flows clockwise around the inner shell 306 (as viewed from the perspective of the rail 120 facing the end region 156).

Another coil 416a on side A of the rail may be wound around the end region 152 of the outer shell 302 such that current flows anti-clockwise around the outer shell 302 (as viewed from the perspective of the rail 120 facing the end region 152). When the current generated by the control system 410 flows through the coils 416a in the direction described above (clockwise around the end region 156 of the inner shell 306 and anti-clockwise around end region 152 of the outer shell 302), the current may generate a bias flux which increases the amount of flux crossing the air gap 180 on side A of the rail 120. The increase in the amount of flux crossing the air gap 180 on side A of the rail 120 would increase the magnetic attraction between the rail 120 and the end regions 152 and 156 on side A of the rail 120. When the current generated by the control system 410 flows through the coils 416a in the reverse direction, the current may generate a bias flux which decreases the amount of flux crossing the air gap 180 on side A of the rail 120. The decrease in the amount of flux crossing the air gap 180 on side A of the rail 120 would decrease the magnetic attraction between the rail 120 and the end regions 152 and 156 on side A of the rail 120.

Similarly, in one embodiment, one coil 416b on side B of the rail 120 may be wound around the end region 156 of the inner shell 306 such that current flows anti-clockwise around the inner shell 306 (as viewed from the perspective of the rail 120 facing the end region 156). Another coil 416b on side B of the rail may be wound around the end region 152 of the outer shell 302 such that current flows clockwise around the outer shell 302 (as viewed from the perspective of the rail 120 facing the end region 152). When the current generated by the control system 410 flows through the coils 416b in the direction described above (anti-clockwise around the end region 156 of the inner shell 306 and clockwise around end region 152 of the outer shell 302), the current may generate a bias flux which decreases the amount of flux crossing the air gap 180 on side B of the rail 120. The decrease in the amount of flux crossing the air gap 180 on side B of the rail 120 would decrease the magnetic attraction between the rail 120 and the end regions 152 and 156 on side B of the rail 120. When the current generated by the control system 410 flows through the coils 416b in the reverse direction, the current may generate a bias flux which increases the amount of flux crossing the air gap 180 on side B of the rail 120. The increase in the amount of flux crossing the air gap 180 on side B of the rail 120 would increase the magnetic attraction between the rail 120 and the end regions 152 and 156 on side B of the rail 120.

The control system 410 may modulate the flux crossing air gaps 180 by controlling the magnitude and direction of current flowing in the coils 416a and 416b. The control system 410 may modulate lateral forces by increasing the flux on one side of rail 120 while decreasing the flux on the opposite side. The control system 410 may increase the levitative force by increasing the flux of both sides of the rail 120 at the same time. The control system 410 may decrease the levitative force by decreasing the flux of both sides of the rail 120 at the same time.

In one embodiment, the strength of the current generated by the control system 410 flowing through the coils 416a on side A of the rail 120 may be proportional to a distance between the rail 120 and a sensor 414a on side A of the rail 120. In one embodiment, the strength of the current generated by the control system 410 flowing through the coils 416a on side A of the rail 120 may be inversely proportional to a distance between the rail 120 and a sensor 414b on side B of the rail 120.

In one embodiment, the strength of the current is proportional or inversely proportional to the square of a distance indicated by the sensors 414a and 414b. In another embodiment, the current is proportional, either linearly or non-linearly, to a difference in distances indicated by sensors 414a and 414b on opposite sides of the rail 120. Because the current is based, at least in part, on a measurement from the sensors 414a and 414b, which is based, at least in part on the current provided, the control system 410 may comprise a servo drive to efficiently perform in this feedback situation. In general, a servo drive receives a command signal from a control system, amplifies the signal, and transmits electric current in order to produce motion proportional to the command signal.

Figure 5:
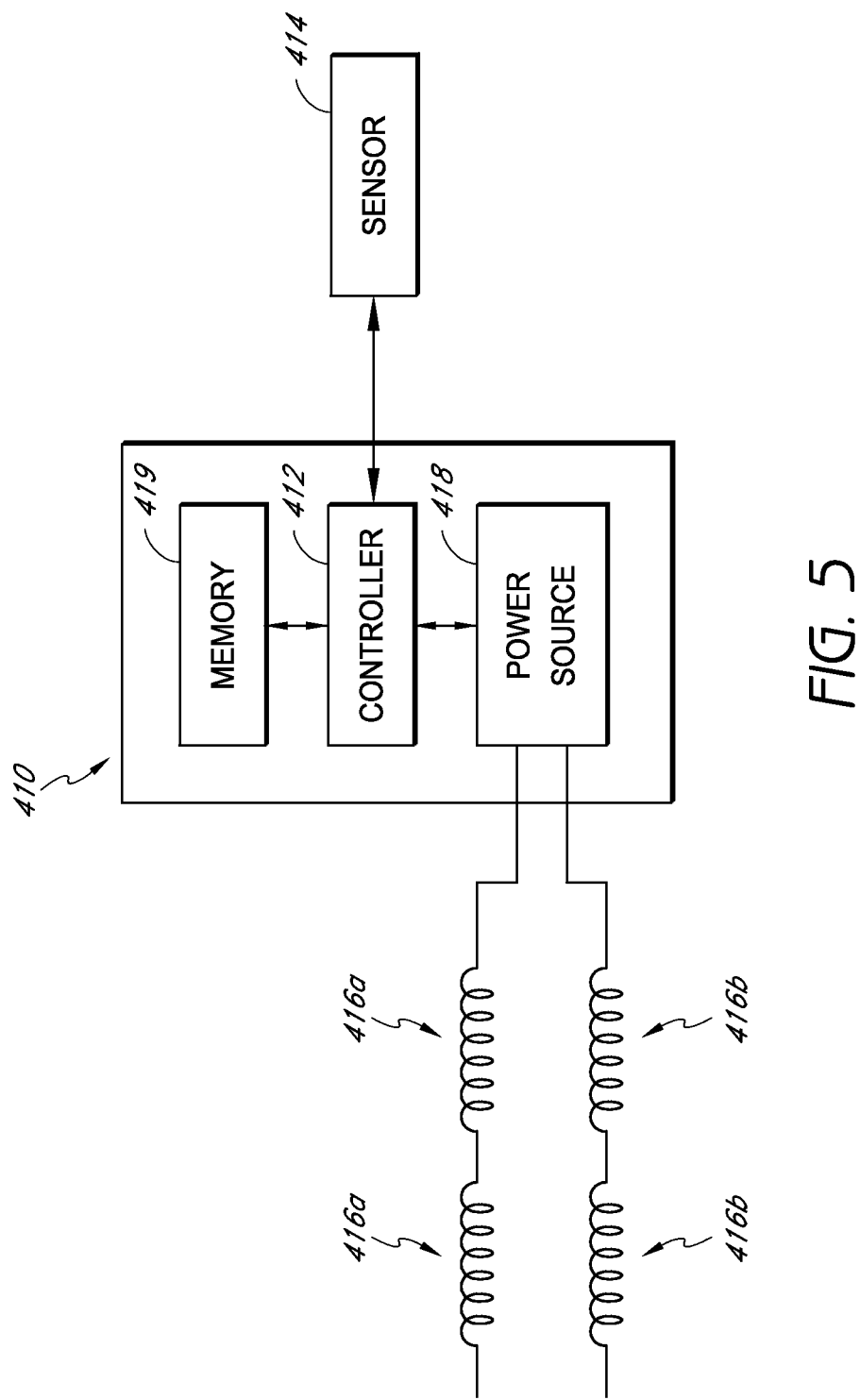
FIG. 5 is a functional block diagram of a control system according to one embodiment.

FIG. 5 is a functional block diagram of a control system 410 according to one embodiment. The control system 410 may comprise a controller 412 coupled to a memory 419, one or more sensors 414, and a power source 418 that is coupled to one or more coils 416a and 416b. The controller 412 receives signals from the one or more sensors 414 and controls the power source 418 to generate a current in one or more of the coils 416 as described above with respect to FIG. 4.

The controller 412 may be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. The controller 412 may also be implemented as a combination of computing devices, e.g., a combination of a DSP and a microprocessor, a plurality of microprocessors, one or more microprocessors in conjunction with a DSP core, or any other such configuration.

The controller 412 may be coupled, via one or more buses, to read information from or write information to the memory 419. The controller 412 may additionally, or in the alternative, contain memory, such as processor registers. The memory 419 may comprise processor cache, including a multi-level hierarchical cache in which different levels have different capacities and access speeds. The memory 419 may also comprise random access memory (RAM), other volatile storage devices, or non-volatile storage devices. In one embodiment, the memory 419 stores an algorithm for determining an appropriate current based on the signal received from the sensor 416.

Figure 6:
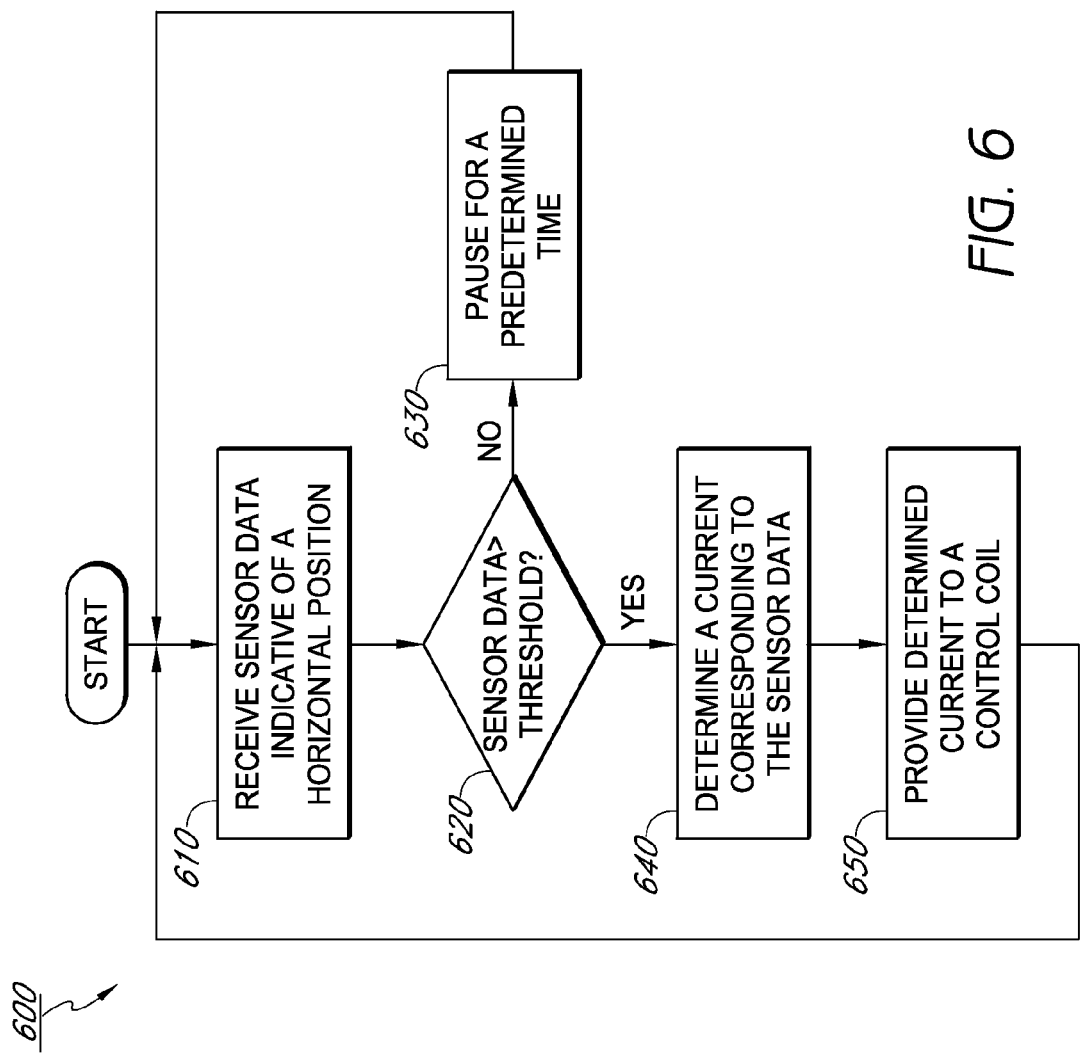
FIG. 6 is flowchart illustrating a method of providing a current to a control coil.

FIG. 6 is flowchart illustrating a method 600 of providing a current to a control coil. The method 600 may be performed, for example, by the control system 410 of FIG. 5. The method 600 begins, in block 610, with the reception of sensor data indicative of a horizontal position. In one embodiment, the sensor data is indicative of a distance from a sensor to a rail, another object, or a predefined reference point. In one embodiment, the sensor data is indicative of a rate of change of a distance from a sensor to a rail, another object, or a predefined reference point. In another embodiment, the sensor data comprises data from multiple sensors, each indicative of a distance or a rate of change of a distance.

Next, in block 620, it is determined whether the sensor data is indicative of a distance or speed greater than a predetermined threshold. The determination may be performed, for example, by the controller 412 of FIG. 5. In one embodiment, the predetermined threshold may be zero. If the distance or speed is less than the predetermined threshold, the method 600 moves to block 630 where the method 600 pauses for a predetermined amount of time. By including blocks 620 and 630, the method 600 does not perform a continuous adjustment which may be energy inefficient or may result in excess jerk.

If it is determined that the sensor data is indicative of a distance or speed greater than the predetermined threshold, the method 600 continues to block 640, where a current corresponding to the received sensor data is determined. The determination may be performed, for example, by the controller 412 of FIG. 5. In one embodiment, the current is determined as described above with respect to FIG. 4. For example, in one embodiment, the current is linearly proportional to a distance indicated by the sensor. In another embodiment is inversely proportional to a distance indicated by the sensor. In another embodiment, the current is proportional or inversely proportional to a square of a distance indicated by the sensor. In another embodiment, the current is proportional, either linearly or non-linearly, to a difference in distances indicated by two sensors on opposite sides of a rail. In yet another embodiment, the current is determined based on a look-up table. Such a look-up table may be stored, for example, in the memory 419 of FIG. 5. In one embodiment, the current is determined proportional to a speed indicated by the sensor. In another embodiment, the current is determined based on a distance and a speed indicated by the sensor.

Continuing to block 650, the determined current is provided to one or more control coils. The current may be provided, for example, by the power source 418 as controlled by the controller 412 of FIG. 5. The current provided to the control coils may generate a magnetic flux within the control coil and thereby bias the magnetic field as described above with respect to FIG. 4 to provide a horizontal force and horizontally center the bearing on the rail. It is to be appreciated that in some embodiments, the determined current may be zero. For example, the determined current may be zero when a magnetic bearing is centered with respect to a rail in the absence of external forces.

After block 650, the method 600 returns to block 610 and repeats. Thus, the method 600 continually provides a current based on sensor data. In one embodiment, the control system 410 continually centers a magnetic bearing with respect to a rail.

FIG. 7 is a perspective view of a system 70 comprising a vehicle 730 having a load 760 coupled to magnetic bearing structures 710, 712, 714, and 716 positioned proximally to rails 120a and 120b. The use of two magnetic bearing structures on two separate rails 120a and 120b rather than a single rail may advantageously inhibit rotation of the magnetic bearing structures with respect to their respective rails 120a and 120b. Further, the use of two magnetic bearing structures on two separate rails 120a and 120b rather than a single rail may advantageously inhibit rotation of the vehicle 730. Thus, in one embodiment, the vehicle 730 comprises two or more magnetic bearing structures on two or more rails 120a and 120b.

In another embodiment, the vehicle 730 includes only one magnetic bearing structure or multiple magnetic bearing structures on a single rail and rotation is inhibited by other means. For example, the vehicle 730 may include two or more wheels which physically contact the ground or other rails on opposite sides of the magnetic bearing structure and oppose the rotation of the vehicle 730.

In the embodiment illustrated in FIG. 7, the vehicle 730 comprises a first bearing 710 positioned proximally to the first rail 120a and a second bearing 712 positioned proximally to the second rail 120b. The vehicle 730 may further comprises a third bearing 714 positioned proximally to the first rail 120a and a fourth bearing 716 positioned proximally to the second rail 120b. The bearings 710, 712, 714, and 716 provide a suspensive or levitative force counteracting the force of gravity acting upon the vehicle 730 and the load 760, thereby reducing friction along the rails. The bearings 710, 712, 714, and 716 are attached to the load 760 via one or more support structures 762. The bearings may be attached via welding, screws, or other affixing techniques. Each bearing 710, 712, 714, and 716 may be structurally the same as one of the magnetic bearing structures described above with respect to FIGS. 1-4. In one embodiment, at least one of the bearings 710, 712, 714, and 716 comprises a focusing source of magnetic flux 205. In one embodiment, at least one of the bearings 710, 712, 714, and 716 comprises an outer shell 302, a source of magnetic flux 304, or an inner shell 306 which has a radially non-uniform thickness and/or strength. In one embodiment, at least one the bearings 710, 712, 714, and 716 comprises at least one control coil located at an end of the bearing 710, 712, 714, and 716.

A control system (not shown) comprising one or more position sensors and one or more control coils may control the horizontal position of the vehicle 730. For example, the control system may keep the bearings 710, 712, 714, and 716 horizontally centered such that the bearings 710, 712, 714, and 716 do not contact the rails 120*a* and 120*b*. This lack of contact may reduce friction. In one embodiment, the one or more control coils are configured to respectively carry one or more electrical currents to provide a horizontal force as described above with respect to FIG. 4.

In one embodiment, the system may use asymmetrical air gaps as described in U.S. patent application Ser. No. 12/048, 062, which is herein incorporated by reference in its entirety. In one embodiment, the inner gaps 180*a* between the bearings 710, 712, 714, and 716 and the rails 120*a* and 120*b* are of a different size than the outer gaps 180*b* between the bearings 710, 712, 714, and 716 and the rails 120*a* and 120*b*. Thus, if the vehicle 730 is displaced horizontally, for example due to a malfunction or "off" state of the control system, only one of the bearings would contact the rails.

Removing the vehicle 730 from this contacting state may be performed by the control system by generating a large current in the coils positioned proximally to where the vehicle contacts the rails. The vehicle 730 could also be removed from this contacting state using a mechanical lift-off system, which provides a horizontal force countering the magnetic attraction. In one embodiment, the vehicle 730 comprises deployable contacts (not shown) that prevent horizontal motion of the vehicle by physically contacting the rail. Advantageously, the deployable contacts could be retracted once the control system is functional and before the vehicle 730 moves along the rail to prevent friction between the deployable contacts and the rail.

The control system may be configured to independently generate a current in control coils wound around each bearing 710, 712, 714, and 716 to control the horizontal position, vertical position, pitch, yaw, and roll of the vehicle 730. The vehicle 730 may also comprise an engine which provides a propulsive force in the direction of the rails 120*a* and 120*b*. Accordingly, the vehicle 730 may be provided six degrees of freedom. In one embodiment, the engine comprises a conventional, wheeled locomotive engine. In another embodiment, the engine comprises a linear motor as described in U.S. patent application Ser. No. 12/048,062 or U.S. Pat. No. 7,617, 779, which is herein incorporated by reference in its entirety.

Although only four bearings 710, 712, 714, and 716 are shown in FIG. 7, it is to be appreciated that a vehicle or system could contain additional independent bearings in various configurations. For example, bearings may be approximately positioned at four corners of a vehicle. As another example, bearings having an approximate axial length similar to that of the vehicle may be positioned on each side of the vehicle. In such an embodiment, the bearings may comprise independently controlled control coils positioned proximally to each axial end of the bearing to control pitch. In one embodiment, multiple vehicles having bearings may be pulled or pushed by one or more wheeled or levitating engines.

Some of the benefits of levitating platforms, such as the vehicle 730 of FIG. 7, as opposed to wheeled carts are, among other things, the reduction of wear on mechanical parts, the reduction of extraneous heat produced, and the reduction of noise. A hybrid levitation system has the potential to be more energy efficient than conventional systems by virtue of the reduced friction. One embodiment of the invention comprises a MagLev system comprising one or more magnetic bearings.

While the above description has pointed out novel features of the invention as applied to various embodiments, the skilled person will understand that various omissions, substitutions, and changes in the form and details of the device or process illustrated may be made without departing from the scope of the invention.

What is claimed is:

1. An apparatus for carrying a load, the apparatus comprising:
   a first structure spaced apart horizontally from a first side of a magnetizable structure and configured to generate magnetic flux;
   a second structure spaced apart horizontally from a second side of the magnetizable structure and configured to generate magnetic flux, wherein the second side is opposite the first side, and wherein the first and second structures are magnetically attracted to the magnetizable structure;
   a third structure spaced apart vertically from the magnetizable structure and configured to generate magnetic flux, wherein the third structure comprises an upper portion and a lower portion of opposite polarities and wherein the lower portion is positioned to magnetically repel from an upper portion of the magnetizable structure; and
   a flux guide positioned between an inner surface of at least one of the first and second structures and an outer surface of the third structure, wherein the flux guide comprises a magnetizable material.

2. The apparatus of claim 1, wherein the third structure is positioned to increase a levitative force produced by the apparatus.

3. The apparatus of claim 1, wherein the third structure comprises a source of magnetic flux.

4. The apparatus of claim 3, wherein the third structure comprises at least one of a permanent magnet, an electromagnet, a rare earth magnet, a samarium-cobalt magnet, an alnico magnet, and a neodymium magnet.

5. The apparatus of claim 4, wherein the controller comprises:
   one or more control coils configured to carry an electric current to bias the magnetic flux generated by the first and second structures;
   one or more sensors configured to generate sensor data indicative of a horizontal position of at least one of the structures with respect to the magnetizable structure; and
   a circuit configured to provide the electric current based on the sensor data.

6. The apparatus of claim 3, wherein a thickness of the third structure is approximately one-fifth a thickness of the source of magnetic flux and a length of the third structure is approximately one-half the length of the source of magnetic flux.

7. The apparatus of claim 1, further comprising a controller configured to control the position of the first and second structures relative to the magnetizable structure.

8. The apparatus of claim 1, further comprising an engine configured to provide a propulsive force along the magnetizable structure.

9. The apparatus of claim 1, further comprising:
a fourth structure spaced apart horizontally from a first side of a second magnetizable structure and configured to generate magnetic flux;
a fifth structure spaced apart horizontally from a second side of the second magnetizable structure and configured to generate magnetic flux, wherein the second side of the second magnetizable structure is opposite the first side of the second magnetizable structure, and wherein the fourth and fifth structures are magnetically attracted to the second magnetizable structure; and
a sixth structure spaced apart vertically from the second magnetizable structure and configured to generate magnetic flux, wherein the sixth structure comprises a second upper portion and a second lower portion of opposite polarities and wherein the second lower portion is positioned to magnetically repel from an upper portion of the second magnetizable structure.

10. The apparatus of claim 9, further comprising a load coupled to the first, second, and third structures and the fourth, fifth, and sixth structures such that the structures restrain rotation of the load.

11. The apparatus of claim 1, further comprising:
a first coil positioned at an inner end region of the first structure, a second coil positioned at an outer end region of the first structure, a third coil positioned at an inner end region of the second structure, and a fourth coil positioned at an outer end region of the second structure.

12. The apparatus of claim 11, wherein at least one of the first and second structures comprises a flux guide comprising a magnetizable material and attached to an inner or outer surface of the structure, wherein at least one of the coils is positioned around the flux guide.

13. The apparatus of claim 11, wherein a length of the end region is approximately equal to a thickness of the end region.

14. The apparatus of claim 11, wherein the end regions are spaced apart from the magnetizable structure a distance that is approximately one-fifth a thickness of the first and second structures.

15. The apparatus of claim 11, further comprising a controller configured to provide an electrical current to at least one of the coils to control the position of the first and second structures relative to the magnetizable structure.

16. The apparatus of claim 15, wherein the controller controls the first and second coils independently from the third and fourth coils.

17. An apparatus for carrying a load, the apparatus comprising:
a first structure spaced apart horizontally from a first side of a magnetizable structure and configured to generate magnetic flux;
a second structure spaced apart horizontally from a second side of the magnetizable structure and configured to generate magnetic flux, wherein the second side is opposite the first side, and wherein the first and second structures are magnetically attracted to the magnetizable structure; and
a flux guide comprising a magnetizable material and configured to concentrate magnetic flux generated by the first and second structure, wherein a first portion of the flux guide is thinner than a second portion of the flux guide that is positioned closer to the magnetizable structure than the first portion of the flux guide.

18. The apparatus of claim 17, wherein the flux guide comprises an inner flux guide attached to an inner surface of the first and second structures and an outer flux guide attached to an outer surface of the first and second structures.

19. The apparatus of claim 18, wherein a first portion of the inner flux guide is thinner than a second portion of the inner flux guide that is positioned closer to the magnetizable structure than the first portion of the inner flux guide and a first portion of the outer flux guide is thinner than a second portion of the outer flux guide that is positioned closer to the magnetizable structure than the first portion of the outer flux guide.

20. The apparatus of claim 17, wherein a thickness of the flux guide decreases in an approximately linear manner from end portions to a middle of the flux guide.

21. The apparatus of claim 17, wherein the flux guide is shaped such that a magnetic flux density within the flux guide is substantially radially uniform.

22. The apparatus of claim 17, further comprising a controller configured to control the position of the first and second structures relative to the magnetizable structure.

23. The apparatus of claim 22, wherein the controller comprises:
one or more control coils configured to carry an electric current to bias the magnetic flux generated by the first and second structures;
one or more sensors configured to generate sensor data indicative of a horizontal position of at least one of the structures with respect to the magnetizable structure; and
a circuit configured to provide the electric current based on the sensor data.

24. The apparatus of claim 17, further comprising:
a third structure spaced apart vertically from the magnetizable structure and configured to generate magnetic flux, wherein the third structure comprises an upper portion and a lower portion of opposite polarities and wherein the lower portion is positioned to magnetically repel from an upper portion of the magnetizable structure; and
at least one coil positioned at at least one end of the at least one flux guide.

25. The apparatus of claim 17, further comprising:
a third structure spaced apart horizontally from a first side of a second magnetizable structure and configured to generate magnetic flux;
a fourth structure spaced apart horizontally from a second side of the second magnetizable structure and configured to generate magnetic flux, wherein the second side of the second magnetizable structure is opposite the first side of the second magnetizable structure, and wherein the third and fourth structures are magnetically attracted to the second magnetizable structure; and
a second flux guide comprising a magnetizable material and configured to concentrate magnetic flux generated by the third and fourth structures, wherein a first portion of the second flux guide is thinner than a second portion of the second flux guide that is positioned closer to the second magnetizable structure than the first portion of the second flux guide.

26. The apparatus of claim 25, further comprising a load coupled to the first, second, third, and fourth structures such that the structures restrain rotation of the load.

* * * * *